United States Patent
Takahashi

(10) Patent No.: US 6,687,783 B1
(45) Date of Patent: Feb. 3, 2004

(54) ACCESS APPARATUS AND METHOD FOR ACCESSING A PLURALITY OF STORAGE DEVICE HAVING DIFFERENT CHARACTERISTICS

(75) Inventor: Tsuyoshi Takahashi, Iwate (JP)

(73) Assignee: Tokyo Electron Device Limited, Kanagawa (JP)

( * ) Notice: Subject to any disclaimer, the term of this patent is extended or adjusted under 35 U.S.C. 154(b) by 0 days.

(21) Appl. No.: 09/349,320

(22) Filed: Jul. 8, 1999

(30) Foreign Application Priority Data

Jul. 10, 1998 (JP) .......................................... 10-195230

(51) Int. Cl.$^7$ ............................................. G06F 12/02
(52) U.S. Cl. ........................ 711/103; 711/170; 711/202
(58) Field of Search ................................. 711/103, 154, 711/156, 170, 171, 115, 173, 202, 203, 206, 209, 100, 111, 112; 369/59.21; 360/48, 57

(56) References Cited

U.S. PATENT DOCUMENTS

| | | | | |
|---|---|---|---|---|
| 5,890,189 A | * | 3/1999 | Nozue et al. ............... | 711/100 |
| 6,014,724 A | * | 1/2000 | Jenett ......................... | 711/103 |
| 6,141,730 A | * | 10/2000 | Nishiumi et al. ........... | 711/115 |
| 6,154,427 A | * | 11/2000 | Yokota et al. ........... | 369/59.21 |
| 6,195,732 B1 | * | 2/2001 | Adams et al. ............... | 711/156 |
| 6,260,102 B1 | * | 7/2001 | Robinson ..................... | 711/103 |
| 6,264,301 B1 | * | 7/2001 | Helterline et al. ............ | 347/19 |
| 6,341,045 B1 | * | 1/2002 | Hironaka et al. ............. | 360/48 |

FOREIGN PATENT DOCUMENTS

| | | | | |
|---|---|---|---|---|
| GB | 2251323 A | * | 7/1992 | ........... G06F/12/02 |
| JP | 63-268085 | | 11/1988 | |
| JP | 2-140820 | | 5/1990 | |
| JP | 04-267445 | | 9/1992 | |
| JP | 06-266607 | | 9/1994 | |
| JP | 07-320018 | | 12/1995 | |
| JP | 09-212411 | | 8/1997 | |
| JP | 10-111829 | | 4/1998 | |
| WO | WO 98/03915 | | 1/1998 | |

* cited by examiner

*Primary Examiner*—Pierre-Michel Bataille
(74) *Attorney, Agent, or Firm*—Luce, Forward, Hamilton & Scripps LLP

(57) ABSTRACT

When a storage medium is set in a control unit, a controller reads out device ID data, CIS data and Identify-Drive data from the storage medium. Based on the device ID data and the CIS data, the controller authenticates the storage medium and stores the Identify-Drive data. A CPU in the controller reads out replacement Identify-Drive data from a storage section in response to a command from a computer. Using the replacement Identify-Drive data, the CPU updates the Identify-Drive data stored in the controller. Hereafter the controller accesses the storage medium in accordance with conditions represented by the updated Identify-Drive data.

4 Claims, 10 Drawing Sheets

ACCESS APPARATUS AND METHOD FOR ACCESSING A PLURALITY OF STORAGE DEVICE HAVING DIFFERENT CHARACTERISTICS

BACKGROUND OF THE INVENTION

1. Field of the Invention

The present invention relates to an access apparatus and method for accessing a storage medium and a computer program product which includes a computer usable medium having a computer readable program embodied therein for accessing the storage medium.

2. Description of the Related Art

Hard disk devices, MOs (Magneto-Optical disks) and flash memories are generally employed as storage mediums (in which data can be written and from which data can be read) accessible by computers, etc. These storage mediums are utilized to store data and to transfer data between computers.

The aforementioned storage mediums need to be accessed under their respective conditions destined for them. Accordingly, an access apparatus needs to be capable of accessing the to-be-accessed storage mediums under the conditions which match with them.

In order to permit the access apparatus to access the storage mediums, those storage mediums store or generate data representing their respective access conditions. The access apparatus acquires the data from the storage mediums and accesses them in accordance with the conditions specified by the acquired data if the access apparatus can fulfill those conditions.

Conventionally, however, such an access apparatus could not access a plurality of kinds of storage mediums without changing its operational setting, unless a storage medium of one kind has the upper compatibility with storage mediums of other kinds.

For the sake of access to the plurality of kinds of storage mediums, therefore, different access apparatuses had to be employed one for each kind. Alternatively, an access apparatus capable of gaining access, under the conditions which conform to a storage medium of one kind having the upper compatibility with storage mediums of other kinds, has to be employed for the sake of access to the plurality of kinds of storage mediums.

In the case of employing different access apparatuses one for each kind of storage medium, the structure of the entire system including the access apparatuses is complicated. On the other hand, in the case of employing an access apparatus capable of gaining access under the conditions which conform to a storage medium of one kind having the upper compatibility with storage mediums of other kinds, the structure of the entire apparatus is also complicated.

SUMMARY OF THE INVENTION

The present invention has been made in consideration of the above-described circumstances, and an object thereof is to provide an access apparatus, a data processing system and an access method, all being capable of gaining, with a simple structure, access to a plurality of kinds of storage mediums whose access conditions are different from each other.

According to the first aspect of the present invention having the above-described object, there is provided an access apparatus comprising:

a controller which acquires condition-defined data from a storage medium that stores data containing the condition-defined data specifying conditions for access to the storage medium, and which performs an acquisition of data from the storage medium and an erasure and storage of data other than the condition-defined data from and into the storage medium in accordance with the conditions specified by the condition-defined data as acquired; and storage which stores replacement data representing contents of a replacement for a to-be-replaced portion of the condition-defined data;

wherein the controller accesses the storage medium in accordance with the conditions specified by the condition-defined data, acquired from the storage medium and whose to-be-replaced portion has been replaced with the replacement data.

According to the above access apparatus, the conditions for access to the storage medium are changed in accordance with the contents of the replacement data. This permits a plurality of kinds of storage mediums, whose access conditions are different from each other, to be accessed employing a simple structure.

According to the second aspect of the present invention, there is provided a data processing system comprising a storage medium which stores data containing condition-defined data that specifies conditions for access to the storage medium, and an access apparatus which acquires the condition-defined data from the storage medium and performs an acquisition of data from the storage medium and an erasure and storage of data other than the condition-defined data from and into the storage medium in accordance with the conditions specified by the condition-defined data as acquired, the accessing apparatus comprising:

storage which stores replacement data representing contents of a replacement for a to-be-replaced portion of the condition-defined data; and a controller which accesses the storage medium in accordance with the conditions specified by the condition-defined data, acquired from the storage medium and whose to-be-replaced portion has been replaced with the replacement data.

According to the above-described data processing system, the conditions for access by the controller are changed in accordance with the contents of the replacement data. This allows a plurality of kinds of storage mediums, whose access conditions are different from each other, to be accessed employing a simple structure.

The storage medium may include identification data stored therein for identifying the storage medium; and the controller may acquire the identification data from the storage medium, determine whether to access the storage medium in accordance with the identification data as acquired, and access the storage medium when the controller determines to access the storage medium.

By so doing, a determination is made in advance as to whether the storage medium is proper as a target to be accessed, thus preventing damage to data stored in the storage medium and improper access to the storage medium.

In this case, the storage may store identification data; and the controller may determine whether there is a substantial match between the identification data acquired from the storage medium and the identification data stored in the storage, and may determine to access the storage medium when the controller determines that there is a substantial match between the acquired identification data and the identification data stored in the storage.

The varieties of accessible storage mediums are increased and access to a storage medium of a novel kind is facilitated by thus storing the identification data in the storage.

In the case where the controller replaces the replacement data stored in the storage with new replacement data in accordance with an externally supplied instruction, the conditions for access can be changed with ease.

The storage medium may have a plurality of storage areas including storage areas which store the data and storage areas which do not store the data; and the controller may create and store an empty area table specifying the storage areas which do not store the data, among the plurality of storage areas, and may cause the storage areas specified by the empty area table to store the data.

The above-described structure allows a storage area, into which data ought to be written, to be quickly discovered from among the plurality of storage areas, with the result that access is speeded up.

The storage medium may have a plurality of storage areas assigned physical addresses and including storage areas which store data to be acquired and storage areas which store data to be erased, and the storage medium may store an address translation table which shows the physical addresses and logical addresses associated therewith; and the controller may perform designating logical addresses specifying the storage areas which store the data to be acquired and the storage areas which store the data to be erased, and specifying the physical addresses associated with the designated logical addresses, based on the address translation table and the designated logical addresses, and accessing the storage areas assigned the specified physical addresses.

By so doing, even if the physical address of a storage area storing specific data is changed, a particular logical address can be assigned to the storage area storing the data. This facilitates the locating of data stored in the storage medium.

In this case, the plurality of storage areas may have been divided into groups;

the address translation table may show the physical addresses assigned to the storage areas belonging to one of the groups and the logical addresses associated with the physical addresses; and the controller may perform determining whether it is possible to specify, based on the address translation table, the physical addresses associated with the logical addresses designated by the controller, and specifying among the groups a group of storage areas assigned the physical addresses associated with the designated logical addresses, when the controller determines that it is impossible to specify the physical address, updating the address translation table so as to show the physical addresses assigned to the specified group of storage areas and the logical addresses associated with the physical addresses, and specifying the physical addresses associated with the logical addresses designated by the controller, based on the updated address translation table and the designated logical addresses, and accessing the storage areas assigned the specified physical addresses.

Employing the above structure, the correspondence between the logical and physical addresses is established as for some storage areas, not for all storage areas. Therefore, even if the entire storage area is large, the amount of information contained in the address translation table is reduced, and the storage capacity required for the storage of the address translation table is reduced accordingly.

According to the third aspect of the present invention, there is provided an access method for acquiring condition-defined data from a storage medium that stores data containing the condition-defined data specifying conditions for access to the storage medium, and for accessing the storage medium in accordance with the conditions specified by the condition-defined data as acquired, the access method comprising the steps of:

storing replacement data which represents contents of a replacement for a to-be-replaced portion of the condition-defined data; and performing an acquisition of data from the storage medium and an erasure and storage of data other than the condition-defined data from and into the storage medium in accordance with the conditions specified by the condition-defined data, acquired from the storage medium and whose to-be-replaced portion has been replaced with the replacement data.

According to the above access method, the conditions for access to the storage medium are changed in accordance with the contents of the replacement data. This enables access to a plurality of kinds of storage mediums, which differ in access condition from each other, to be gained employing a simple structure.

The storage medium may include identification data stored therein for identifying the storage medium; and the access method may further comprise the steps of acquiring the identification data from the storage medium, determining whether to access the storage medium in accordance with the acquired identification data, and accessing the storage medium when it is determined to access the storage medium.

By so doing, a determination is made in advance as to whether the storage medium is proper as a target to be accessed, thus preventing damage to data stored in the storage medium and improper access to the storage medium.

In this case, the access method may further comprise the steps of determining whether there is a substantial match between the identification data acquired from the storage medium and pre-stored collation data, and determining to access the storage medium when it is determined that there is a substantial match between the acquired identification data and the pre; stored collation data. The varieties of accessible storage mediums are increased and access to a storage medium of a novel kind is facilitated by thus preparing the collation data in advance for use in the identification of the storage mediums.

The storage medium may have a plurality of storage areas including storage areas which store the data and storage areas which do not store the data; and the access method may further comprise the steps of creating and storing an empty area table specifying the storage areas which do not store the data, among the plurality of storage areas, and causing the storage areas specified by the empty area table to store the data.

The above-described structure allows a storage area, into which data is ought to be written, to be quickly discovered from among the plurality of storage areas, with the result that access is speeded up.

The storage medium may have a plurality of storage areas assigned physical addresses and including storage areas which store data to be acquired and storage areas which store data to be erased, and the storage medium may store an address translation table which shows the physical addresses and logical addresses associated therewith; and the access method may further comprise the steps of designating logical addresses specifying the storage areas which store the data to be acquired and the storage areas which store the data to be erased, and specifying the physical addresses associated with the designated logical addresses, based on the address translation table and the designated logical addresses, and accessing the storage areas assigned the specified physical addresses.

By so doing, even if the physical address of a storage area storing specific data is changed, a particular logical address can be assigned to the storage area storing the data. This facilitates the locating of data stored in the storage medium.

In this case, the plurality of storage areas may have been divided into groups;

the address translation table may show the physical addresses assigned to the storage areas belonging to one of the groups and the logical addresses associated with the physical addresses; and the access method may further comprise the steps of
determining whether it is possible to specify, based on the address translation table, the physical addresses associated with the designated logical addresses, and specifying among the groups a group of storage areas assigned the physical addresses associated with the designated logical addresses, when it is determined that it is impossible to specify the physical address,
updating the address translation table so as to show the physical addresses assigned to the specified group of storage areas and the logical addresses associated with the physical addresses, and
specifying the physical addresses associated with the designated logical addresses, based on the updated address translation table and the designated logical addresses, and accessing the storage areas assigned the specified physical addresses.

Employing the above structure, the correspondence between the logical and physical addresses is established as for some storage areas, not for all storage areas. Therefore, if the entire address area is large, the amount of information contained in the address translation table is reduced, and the storage capacity required for a storage of the address translation table is reduced accordingly.

According to the fourth aspect of the present invention, there is provided a computer program product, including a computer usable medium having a computer readable program embodied therein for causing a computer, which performs an acquisition of data from a storage medium and an erasure and storage of data from and into the storage medium, to serve as:

storage which stores replacement data representing contents of a replacement for a to-be-replaced portion of condition-defined data specifying conditions for access to the storage medium; and a controller which acquires the condition-defined data from the storage medium that stores data containing the condition-defined data, and which performs an acquisition of data from the storage medium and an erasure and storage of data other than the condition-defined data from and into the storage medium in accordance with the conditions specified by the condition-defined data, acquired from the storage medium and whose to-be-replaced portion has been replaced with the replacement data.

A computer, which executes the program stored in such a storage medium, changes the conditions for access to the storage medium in accordance with the contents of the replacement data. This enables access to a plurality of kinds of storage mediums, which differ in access condition from each other, to be gained employing a simple structure.

According to the fifth aspect of the present invention, there is provided a computer data signal embedded in a carrier wave and representing a program for causing a computer, which performs an acquisition of data from a storage medium and an erasure and storage of data from and into the storage medium, to serve as:

storage which stores replacement data representing contents of a replacement for a to-be-replaced portion of condition-defined data specifying conditions for access to the storage medium; and a controller which acquires the condition-defined data from the storage medium that stores data containing the condition-defined data, and which performs an acquisition of data from the storage medium and an erasure and storage of data other than the condition-defined data from and into the storage medium in accordance with the conditions specified by the condition-defined data, acquired from the storage medium and whose to-be-replaced portion has been replaced with the replacement data.

A computer, which executes the program represented by such a computer data signal, changes the conditions for access to the storage medium in accordance with the contents of the replacement data. This enables access to a plurality of kinds of storage mediums, whose access conditions are different from each other, to be gained employing a simple structure.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENT

A preferred embodiment of the present invention will now be described with reference to the accompanying drawings.

Figure 1:
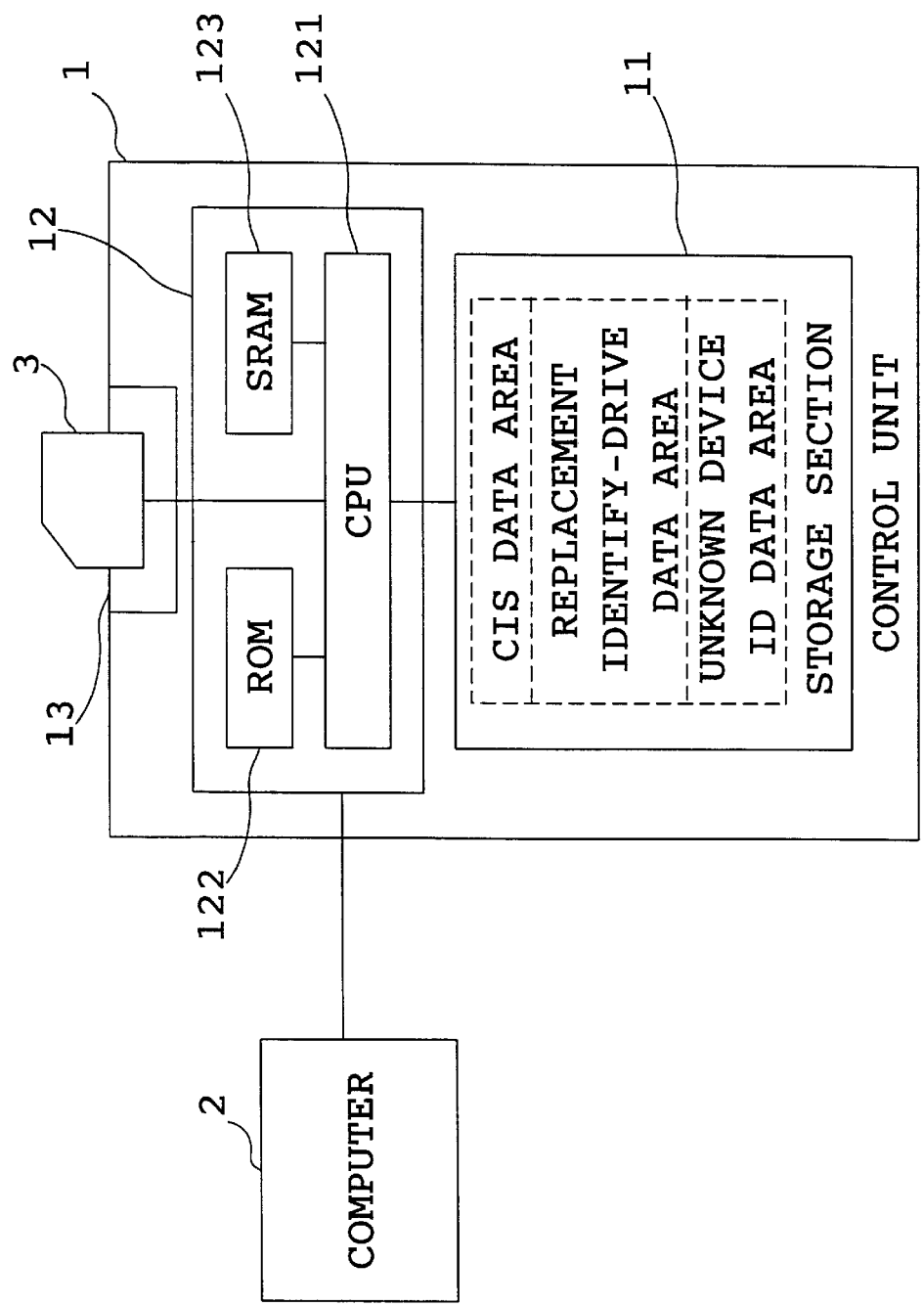
FIG. 1 is a block diagram illustrating the structure of an access apparatus according to an embodiment of the present invention.

FIG. 1 is a block diagram illustrating the physical structure of an access apparatus according to an embodiment of the present invention. The access apparatus accesses a storage medium comprising a flash memory.

As illustrated, the access apparatus comprises a control unit 1 and a computer 2. The control unit 1 is detachably inserted in the computer 2 through a slot in the computer 2.

The slot in the computer 2 is, for example, a PCMCIA slot for a relay to a PCMCIA bus.

The control unit 1 has a storage section 11, a controller 12 and a slot 13.

The storage section 11 comprises a storage device such as an EEPROM (Electrically Erasable/Programmable Read Only Memory), for example.

In response to the access effected by the controller 12, the storage section 11 performs the storage of data supplied from the computer 2 into the storage section 11, the supply of data from the storage section 11 or the erasure of data stored in the storage section 11.

As illustrated in FIG. 1, the storage section 11 has a storage area which contains a CIS (Card Information Structure) data area, a replacement Identify-Drive data area and an unknown device ID data area.

To be specific, the storage area of the storage section 11 is assigned addresses. A 256-byte storage area extending from the beginning address forms the CIS data area. A 224-byte storage area subsequent to the CIS data area forms the replacement Identify-Drive data area. A 32-byte storage area subsequent to the replacement Identify-Drive data area forms the unknown device ID data area.

The CIS data area stores CIS data. The CIS data stored in the CIS data area serves as collation data, which is compared with CIS data stored in a storage medium 3 as will be described later, in order to determine whether the storage medium 3 is proper. The CIS data stored in the CIS data area contains parameters including, for example, power source information representing the recommendation value of a power source voltage which the controller 12 consumes to access the storage medium which will be described later. For example, a predetermined ID code (tuple ID) for identifying what is represented by each parameter has been affixed to the beginning of each parameter. Hence, the designation of one tuple ID results in one parameter being specified.

The replacement Identify-Drive data area stores replacement Identify-Drive data. The controller 12 uses the replacement Identify-Drive data in place of the Identify-drive data supplied from the storage medium 3 as will be explained later.

Figure 2:
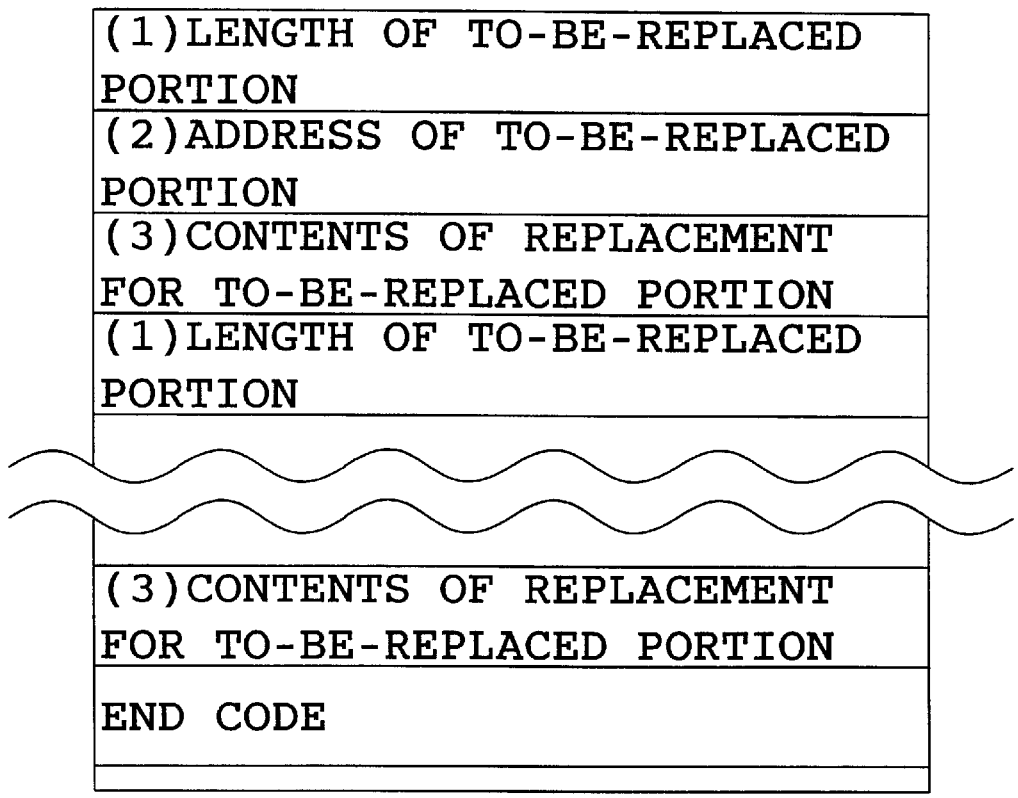
FIG. 2 is a diagram which schematically illustrates the structure of replacement Identify-Drive data.

The replacement Identify-Drive data has the data structure illustrated in FIG. 2, for example. As illustrated, the replacement Identify-Drive data comprises a data set including: (1) 1-byte data which represents the length of a to-be-replaced continuous portion of the Identify-Drive data; (2) 1-byte data which represents the address of the to-be-replaced portion specified by the 1-byte data mentioned in (1); and (3) data which has the length equal to that shown by the 1-byte data recited in (1), and which is a replacement for the to-be-replaced portion specified by the 1-byte data mentioned in (1) and (2).

The number of data sets as contained is identical with the number of to-be-replaced continuous portions of the Identify-Drive data. An end code showing a predetermined value (e.g. hexadecimal "FFFFh") is arranged at the end of the replacement Identify-Drive data. (In the present specification and FIG. 6, the number followed by the letter "h" is a hexadecimal number.)

The unknown device ID data area stores the unknown device ID data. The controller 12 uses the unknown device ID data in order to identify, in accordance with the procedures which will be described later, the storage medium 3 that the controller 12 cannot identify by itself.

Figure 3:
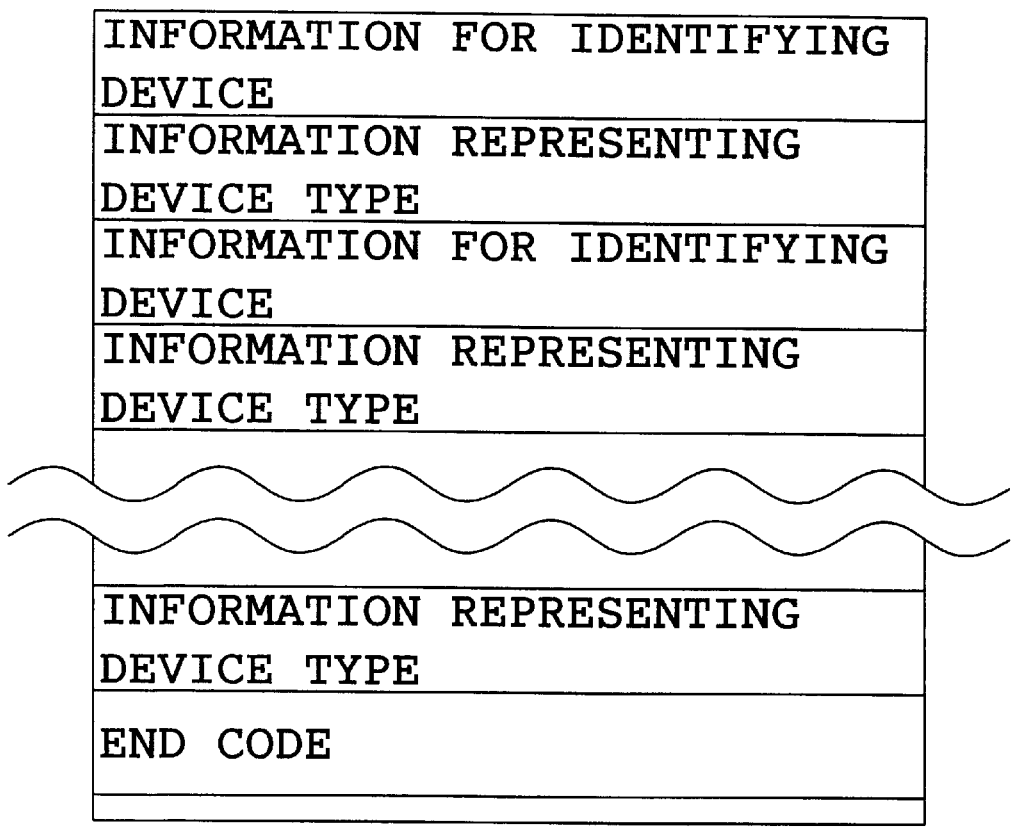
FIG. 3 is a diagram which schematically illustrates the structure of unknown device ID data.

The unknown device ID data has the data structure illustrated in FIG. 3, for example.

As illustrated, the unknown device ID data contains data items, each of which corresponds to one word and the number of which is the same as the number of devices that the controller 12 can be rendered identifiable. The upper 1 byte of each data item corresponding to one word represents information for identifying one of the devices which the controller 12 can be set accessible. The lower 1 byte of each data item represents accessible device type. Each of these data items is substantially identical in structure with device ID (IDentification) data which will be described later and which has been stored in the storage medium 3 that the controller 12 cannot identify by itself. Furthermore, the unknown device ID data has an end code at its end, which end code shows a predetermined value.

The CIS data, the replacement Identify-Drive data and the unknown device ID data are supplied from sources for the control unit 1 and are stored in advance in the CIS data area, the replacement Identify-Drive data area and the unknown device ID data area, respectively.

The controller 12 updates the replacement Identify-Drive data in accordance with a command supplied to the controller 12 from the computer 2.

As illustrated in FIG. 1, the controller 12 comprises a CPU (Central Processing Unit) 121, a ROM (Read Only Memory) 122 and an SRAM (Static Random Access Memory) 123.

The CPU 121 has been connected to the ROM 122, the SRAM 123, the storage section 11 and the slot 13. Moreover, the CPU 121 has been detachably connected to the computer 2 through the PCMCIA slot in the computer 2.

The CPU 121 waits for the storage medium 3 being inserted in the slot 13. When the CPU 121 detects the insertion of the storage medium 3, the CPU 121 carries out a process which will be described later, in accordance with a program pre-stored in the ROM 122 by the manufacturer or the like of the controller 12.

When the CPU 122 receives commands from the computer 2 of the access apparatus, the CPU 121 executes the commands. Those commands, which are executed by the CPU 121, includes a command to access the storage section 11 and a command to access the storage medium 3 inserted in the slot 13.

The ROM 122 stores the aforementioned program to be executed by the CPU 121 and the authentication information which represents part of the CIS data. The authentication information is pre-stored in the ROM 122 by the manufacturer or the like of the controller 12.

The SRAM 123 is used as a work area for the CPU 121. Moreover, the SRAM 123 stores the CIS data and Identify-Drive data which the CPU 121 reads out from the storage medium 3 by the procedures which will be explained later.

Furthermore, the SRAM 123 stores a BSI (Block Search Index) and a BPT (Block Pointer Table) which the CPU 121 creates by the procedures which will be described later.

The BSI stores information showing which block in the storage medium 3 is an empty block (a block in a reset state).

Each time the access apparatus is activated, the BSI is created by the procedures which the controller 12 carries out as will be explained later.

Figure 5:
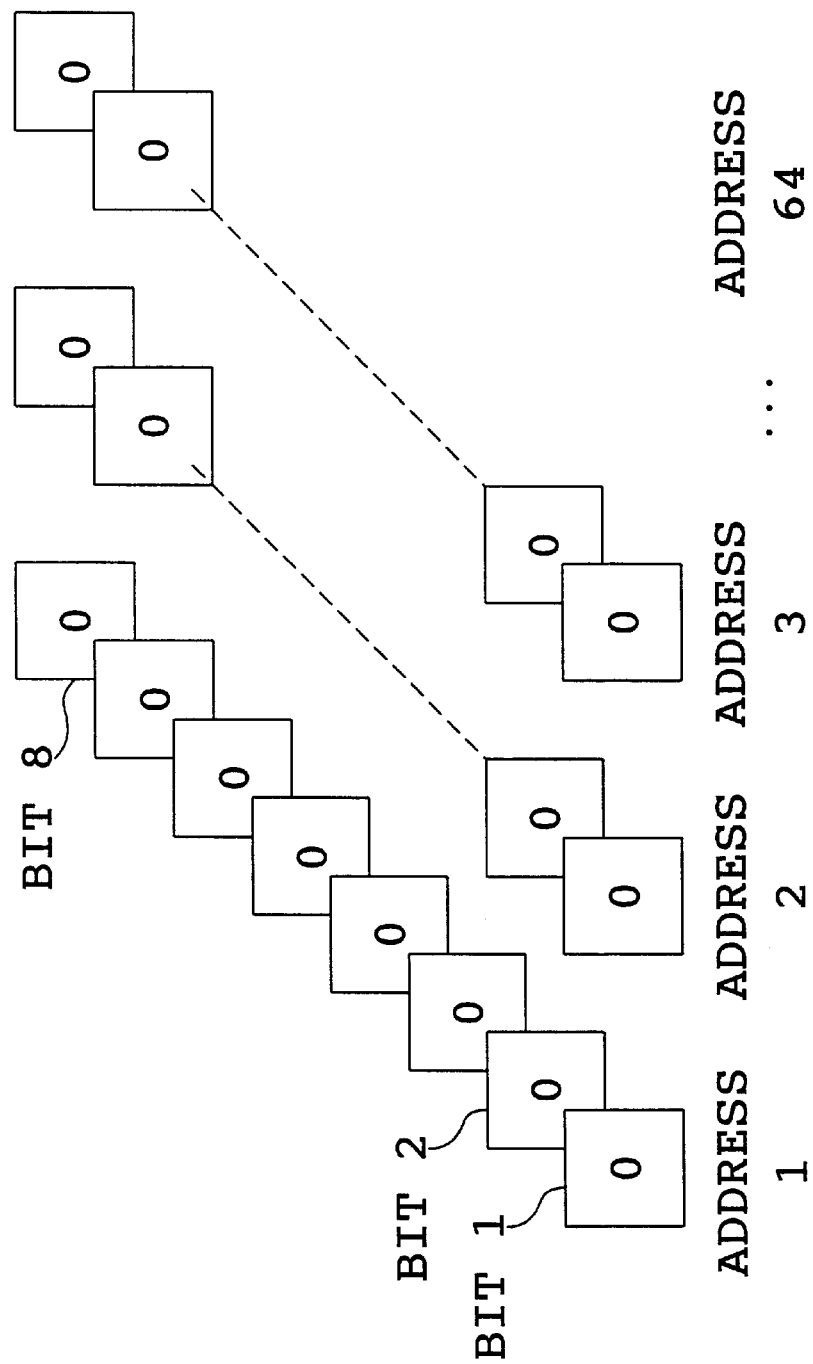
FIG. 5 is a diagram which schematically depicts the data structure of a BSI.

FIG. 5 exemplifies the structure of the BSI in the case where the total number of blocks contained in the storage medium 3 is 512. As shown in FIG. 5, the BSI comprises 64-byte data whose first to last bits are in one-to-one correspondence with blocks 0 to 511. When the blocks are empty, the value "1" is stored in the corresponding bits of the BSI, whereas when the blocks are not empty, the value "0" is stored in the corresponding bits of the BSI.

The BPT stores information showing the correspondence between logical and physical block addresses which will be described later. Each time the BSI is created, the BPT is created by the procedures which will be explained later, and is stored in the SRAM 123.

The BPT has a storage area which occupies a predetermined logical location in the SRAM 123 and which is used to store the physical block addresses associated with the logical block addresses.

Figure 6:
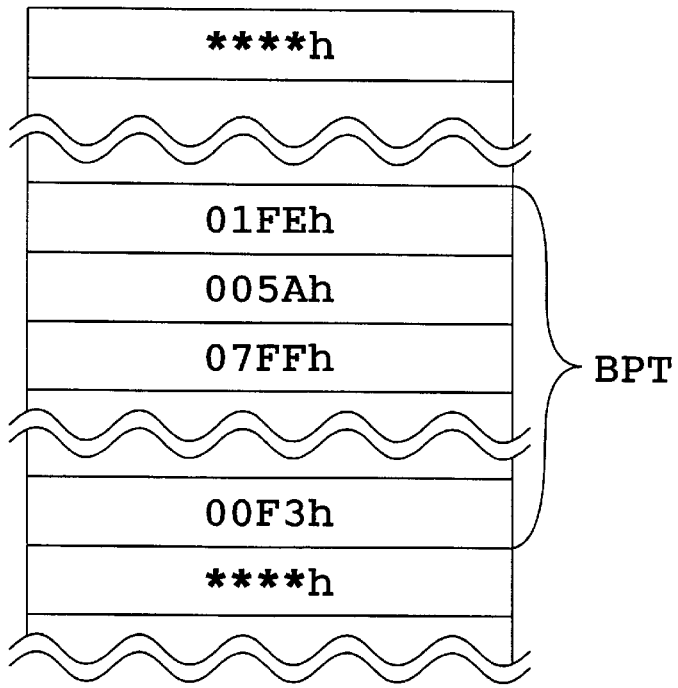
FIG. 6 is a diagram exemplifying the structure of a BPT.

Specifically, the BPT has the data structure illustrated in FIG. 6, for example.

That is, in the case where the total number of logical block addresses is 500, for example, the BPT has a 500-word storage area which is made up of storage areas each corresponding to one word. Addresses 1000h to 11F3h are assigned word by word to those storage areas sequentially from the top storage area.

Each of the addresses assigned to the storage areas forming the BPT is equal to the sum of a logical block address and the value of the minimum difference (i.e. the offset) between the addresses assigned to the storage areas. The storage areas, to which the addresses have been assigned and each of which corresponds to one word, store values representing the physical block addresses of the blocks associated with the logical block addresses specified by the assigned addresses.

To be specific, let it be assumed that the value "005Ah" is stored in the storage area which has been assigned address 1001h, and the offset is 1000h, as shown in FIG. 6, for example. In this case, a block assigned physical block address 005Ah is associated with logical block address 0001h.

However, in the case where a predetermined value (e.g. the value "07FFh" shown in FIG. 6) is stored in the storage areas to which the addresses have been assigned, there are no physical block addresses associated with the logical block addresses specified by the assigned addresses.

The slot 13 has been connected to the controller 12, while the storage medium 3, comprising an EEPROM or the like, has been removably inserted in the slot 13.

Figure 4:
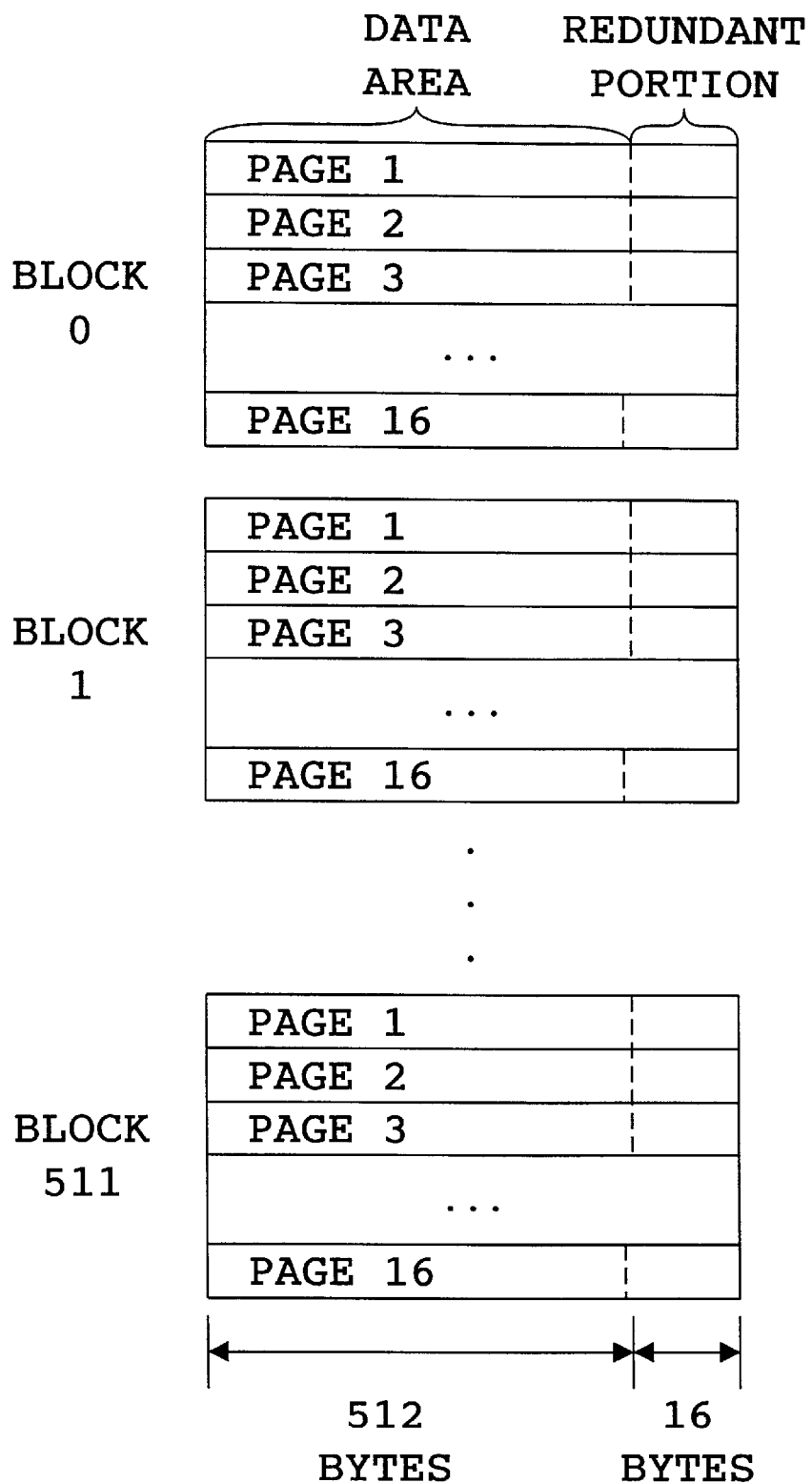
FIG. 4 is a diagram which schematically depicts the logical structure of the storage area of a storage medium.

The storage medium 3 has an 8912-page storage area as shown in FIG. 4, for example. Each of the pages forming this storage area has a storage capacity of 528 bytes. The pages have been assigned serial page addresses 0 to 8191. The memory cells contained in each page have been assigned serial addresses 0 to 527.

Every sixteen pages from top constitutes one block. Each block has a storage capacity of 8 kilobytes. The entire storage area comprises 512 blocks having serial physical block addresses 0 to 511 assigned thereto.

Moreover, each page has a data area, which occupies the first 512 bytes, and a redundant portion which occupies the remaining 16 bytes.

Main data (to-be-written data supplied from the computer 2 and data to be supplied to the computer 2) is stored in the data area. An error check code or the like for verifying that the contents of the main data have not been destroyed, is stored in the redundant portion.

The value of the logical block address assigned to each block is also stored in the redundant portion of each of the pages belonging to that block.

The logical block addresses are units which the controller 12 recognizes as data writing units when data is read from or written in the storage medium 3 by the operations which will be described later. The total number of blocks having the logical block addresses assigned thereto is a predetermined number (e.g. 500) which is smaller than the total number of physical blocks contained in the storage medium 3.

When the controller 12 of the control unit 1 issues an instruction to erase data from a specific block, the storage contents of all memory cells contained in the specific block are reset in the storage medium 3. (More specifically, the value stored in each of the above memory cells is reset at "1" in the case where the storage medium 3 comprises an NAND-type flash memory.)

The CIS data and the Identify-Drive data are pre-stored in the storage medium 3 by the manufacturer of the like of the storage medium 3.

In the case where the storage medium 3 to be accessed by the controller 12 is proper, there is a substantial match between the CIS data stored in the storage medium 3 and the CIS data stored in the CIS data area of the storage section 11 of the control unit 1.

The Identify-Drive data contains a parameter for identifying the storage medium 3, a parameter indicating the structure of a storage area in the storage medium 3, and a parameter which designates a data writin-greading method and speed. These parameters contained in the Identify-Drive data are arranged in a predetermined order. Each parameter is specified upon specifying of its location relative to the beginning of the Identify-Drive data.

At least one part of the CIS data and at least one part of the Identify-Drive data are stored in a specific block whose storage contents cannot basically updated in accordance with external access, among the blocks contained in the storage medium 3. In other words, the controller 12 is basically inhibited from updating, of the CIS data and Identify-Drive data in the storage medium 3, those parts stored in the above-mentioned specific block.

Furthermore, the storage medium 3 comprises a logic circuit, etc. When a command to acquire device ID data which will be described later, is supplied from the CPU 121 of the controller 12, the logic circuit, etc. send the device ID data to the CPU 121 in return.

In the case where the storage medium 3 is a proper storage medium to be accessed by the controller 12, the device ID data stored in the storage medium 3 is: (a) predetermined data which the CPU 121 of the controller 12 determines as being proper according to a process which will be described later; or (b) data which substantially matches with any data item contained in the unknown device ID data stored in the unknown device ID data area of the storage section 11.

The computer 2 comprises a personal computer or the like, and is provided with a PCMCIA slot. The computer 2 stores an OS and a driver and executes the OS after the computer 2 is switched on. When the computer 2 detects that the control unit 1 has been inserted in the PCMCIA slot, the computer 2 starts the driver in accordance with the processing which the OS performs.

The computer 2, which handles the driver, supplies the aforementioned command to the controller 12, or supplies data to be written in the storage section 11 or the storage medium 3 to the controller 12 so that the CPU 121 accesses the storage section 11 or the storage medium 3. In accordance with the command supplied from the computer 2, the CPU 121 reads out data from the storage section 11 or the storage medium 3, and supplies the read-out data to the computer 2. The computer 2 acquires the data supplied from the CPU 121.

(Operations)

The operations of the access apparatus will now be described with reference to FIG. 7.

Figure 7:
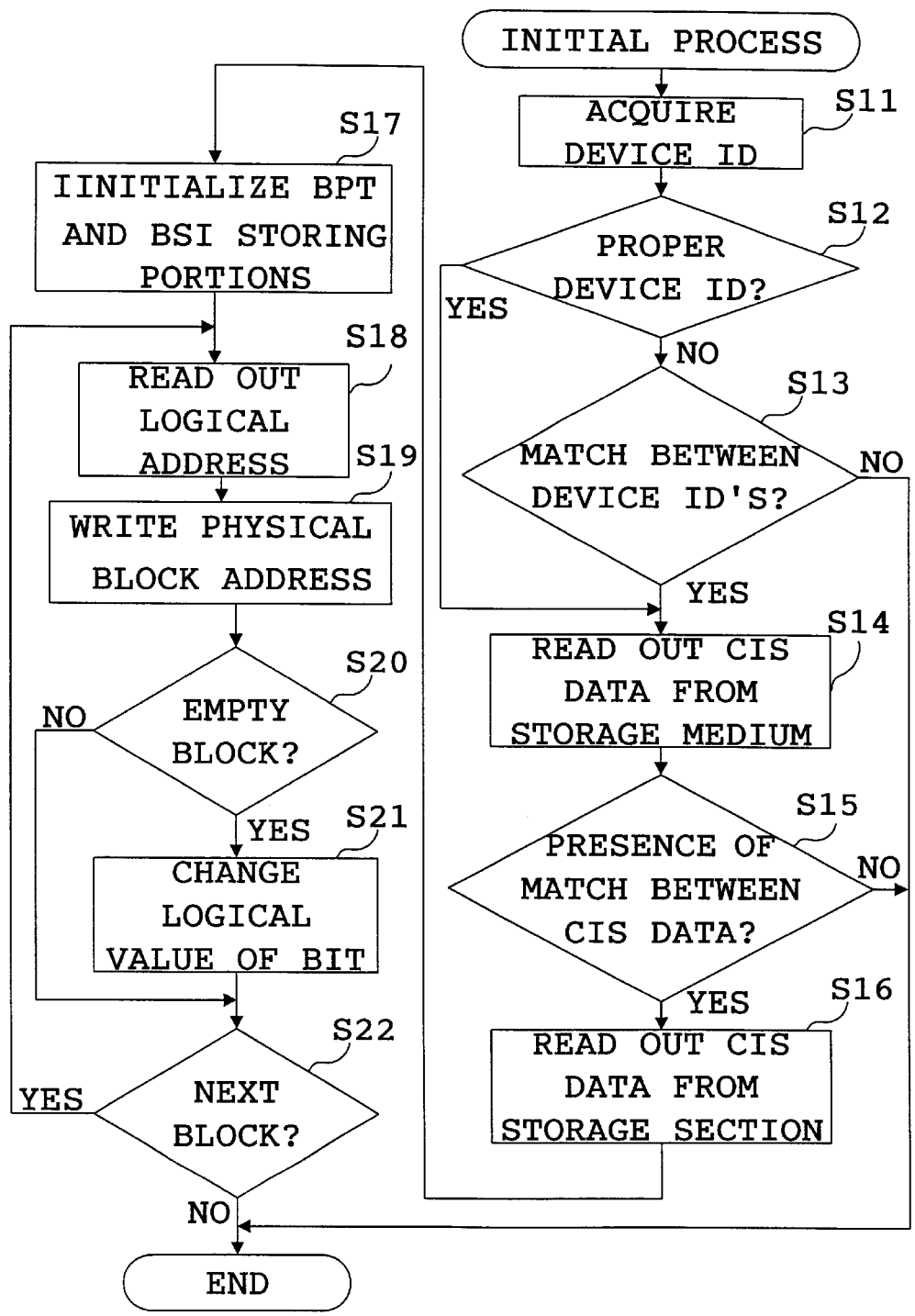
FIG. 7 is a flowchart showing an initial process.

FIG. 7 is a flowchart showing the initial process.

(Initial Process)

When the access apparatus is activated and the storage medium 3 is inserted in the slot 13 in the control unit 1, the CPU 121 in the controller 12 of the control unit 1 detects that the storage medium 3 has been inserted in the slot 13, and executes the initial process shown in FIG. 7.

Having started the initial process, the CPU 121 supplies the command to acquire the device ID data to the storage medium 3. In response to this command, the storage medium 3 sends the device ID data to the CPU 121, in which manner the CPU 121 acquires the device ID data (a step S11). Then, the CPU 121 determines whether the acquired device ID data is proper data specifying the storage medium 3 to be accessed by the CPU 121 (a step S12). When the CPU 121 determines that the device ID data is proper, the access apparatus advances the process to a step S14.

On the other hand, when the CPU 121 determines that the device ID data is improper, the CPU 121 reads out the unknown device ID data stored in the unknown device ID data area of the storage section 11. Then the CPU 121 determines whether there is a match between the device ID data read out from the storage medium 3 and the unknown device ID data read out from the storage section 11 (a step S13).

When the CPU 121 determines in the step S13 that there is a match between the device ID read out from the storage medium 3 and the unknown device ID data read out from the storage section 11, the CPU 121 advances the process to the step S14. When the CPU 121 determines that there is no match between the device ID read out from the storage medium 3 and the unknown device ID data read out from the storage section 11, the CPU 121 determines that the storage medium inserted in the slot 13 is improper, and then terminates the process.

Even if any further command is supplied from the computer 2 after the termination of the process, the CPU 121 does not accept the command until the CPU 121 detects that a proper storage medium has been newly inserted as the storage medium 3. In other words, the CPU 121 does not basically access the data area of the storage medium 3 until the CPU 121 detects that a proper storage medium has been newly inserted as the storage medium 3.

In the step S14, the CPU 121 reads out the authentication information representing part of the CIS data from the ROM 122. Further, the CPU 121 reads out the CIS data from a specific block of the storage medium 3 which stores the CIS data and the Identify-Drive data. The CPU 121 also reads out the Identify-Drive data from the aforementioned specific block, and causes the SRAM 123 to store the read-out Identify-Drive data.

In the step S14, the CPU 121 need not read out the entirety of the CIS data from the storage medium 3. The CPU 121 may read out, from the storage section 3, only that specific part of the CIS data which should substantially match with the authentication information read out from the ROM 122 if the CIS data is proper.

Next, the CPU 121 verifies whether the storage medium 3 is controllable by the control unit 1. In other words, the CPU 121 determines whether there is actually a substantial match between the CIS data read out from the storage section 3 and the authentication information read out from the ROM 122 (a step S15).

When the CPU 121 determines that there is no substantial match between the CIS data and the authentication information, the accessing device terminates the process, for the reason that the storage medium 3 inserted in the slot 13 in the control unit 1 is improper.

On the other hand, when the CPU 121 determines that there is actually a substantial match between the CIS data and the authentication information, the CPU 121 reads out the CIS data stored in the CIS data area of the storage section 11, and causes the SRAM 123 to store the read-out CIS data (a step S16). Then, the CPU 121 initializes, of the storage area of the SRAM 123, those portions which store the BPT and the BSI (a step S17).

More specifically, in the step S17, as regards the BPT storing portion of the storage area of the SRAM 123, the CPU 121 stores a predetermined value (e.g. the value "07FFh" mentioned previously) in the segments forming the BPT storing portion and having the addresses assigned word by word. This predetermined value indicates that no physical block addresses are associated with the above segments. As regards the BSI storing portion of the storage area of the SRAM 123, the CPU 121 sets, at "0", the logical values of all bits contained in the BSI storing portion (a step S18).

Next the CPU 121 specifies, among the individual blocks of the storage medium 3, the block whose physical block address is smallest and from which no logical block address has been read. Thereafter, the CPU 121 reads out a logical block address from the redundant portion of one of the pages belonging to the block specified among the individual blocks of the storage medium 3 (a step S18).

Then, the CPU 121 writes the physical block address of the block from which the logical block address has been read, into one segment having the address corresponding to the read-out logical block address, among the segments forming the BPT storing portion of the SRAM 123 (a step Si 9). By so doing, new information showing the correspondence between the physical block address and the logical block address is added to the BPT.

Next the CPU 121 determines whether the block from which the logical block address has been read lastly in the step S18 is an empty block or not (a step S20). To be specific, the CPU 121 determines whether an empty block code in a predetermined form has been stored in the redundant portion of one of the pages belonging to the block from which the logical block address has been read lastly in the step S18.

When the CPU 121 determines that the block is not an empty block, then the CPU 121 advances the process to a step S22. On the other hand, when the CPU 121 determines that the block is an empty block, the CPU 121 calculates where the bit representing the physical block address which specifies the empty block is present in the BSI storing portion of the storage area of the SRAM 123. The CPU 121 changes, to "1", the logical value of the bit whose location has been calculated (a step S21) and advances the process to a step S22.

In the step S22, the CPU 121 determines whether any block follows after the block from which the logical block address has been read in the step S18. When the CPU 121 determines that any block follows, the CPU 121 returns the process to the step S18. When the CPU 121 determines that no block follows, the CPU 121 terminates the initial process.

By the initial process explained above, the storage medium 3 is authenticated using the CIS data, the Identify-Drive data is read, and the BSI and the BPT are created.

(Process for Updating Identify-Drive Data)

The Identify-Drive data, read out from the storage medium 3 and stored in the storage area of the SRAM 123, is updated by a process which is carried out by the CPU 121 when the computer 2 supplies a command to update the Identify-Drive data to the CPU 121.

To be specific, when the CPU 121 receives the command to update the Identify-Drive data from the computer 2, the CPU 121 reads out the replacement Identify-Drive data from the replacement Identify-Drive data area of the storage section 11, in response to the command.

Of the Identify-Drive data stored in the SRAM 123, that part which is specified by the aforementioned data (1) and (2) contained in the read-out replacement Identify-Drive data is replaced with the data (3) contained in the replacement Identify-Drive data.

If data which concerns, among conditions for access to the storage medium 3, the specifications of the computer 2, for example, is incorporated in the replacement Identify-Drive data in advance, the storage medium 3 after the point in time the Identify-Drive data is updated by the above-described process, in accordance with the command from the computer 2, will be accessed under the conditions conforming to the specifications of the computer 2.

For example, let it be assumed that the Identify-Drive data contains information which designates the maximum speed of access to the storage medium 3, and the maximum speed of access by the computer 2 to the controller 12 is lower than the maximum speed of access by the controller 12 to the storage medium 3.

In the above case, information by which a speed lower than the maximum speed of access by the computer 2 to the controller 12 is designated as the maximum speed of access to the storage medium 3 is incorporated in advance in the replacement Identify-Drive data. If information which the Identify-Drive data contains to designate the maximum speed of access to the storage medium 3 is replaced with the above-described information incorporated in the replacement Identify-Drive data, the maximum speed of access by the controller 12 to the storage medium 3 will be restricted so as to be lower than the maximum speed of access by the computer 2 to the controller 12.

(Process for Replacing Replacement Identify-Drive Data with New Replacement Identify-Drive Data)

In the case of replacing the replacement Identify-Drive data with new replacement Identify-Drive data, the computer 2 supplies a command to perform the replacing of the replacement Identify-Drive data and the new replacement Identify-Drive data to the CPU 121.

When the CPU 121 receives the command to perform the replacing of the replacement Identify-Drive data and the new replacement Identify-Drive data, the CPU 121 erases the replacement Identify-Drive data currently stored in the storage section 11. The CPU 121 then writes the new replacement Identify-Drive data supplied from the computer 2 into the storage location where the erased replacement Identify-Drive data had been present.

In this manner, the replacement Identify-Drive data is replaced with the new replacement Identify-Drive data. If the initial process is again performed thereafter, the Identify-Drive data stored in the SRAM 123 will be updated in accordance with the new replacement Identify-Drive data.

(Data Reading Process)

Having finished the initial process, the CPU 121 of the control unit 1 accepts the command to access the storage medium 3, supplied from the computer 2.

In the case of instructing the CPU 121 to read out data from the storage medium 3, the computer 2 supplies, to the CPU 121, a data readout command and information designating a storage area from which data is to be read.

Specifically, information in CHS (Cylinder-Head-Sector) format, for example, is adopted as the information designating the storage area from which data is to be read. The information in CHS format specifies one of segments into which the virtual storage area of the size corresponding to that of the entire storage area of the storage medium 3 has been divided according to three classes, i.e., cylinder, head and sector.

The format of the information designating the storage area from which data is to be read, is arbitrary. For example, information in LBA (Logic Block Address) format may be adopted as the information designating the storage area from which data is to be read. The information in the LBA format represents one of serial numbers starting from 0 and assigned to segments into which the virtual storage area of the size corresponding to that of the entire storage area of the storage medium 3 has been divided as areas each having a capacity of 512 bytes.

Having supplied with the data readout command and the information designating the storage area from which data is to be read, the CPU 121 converts the above information thereby to create: (A) information specifying to which block the designated storage area corresponds, among the individual blocks contained in the storage medium 3 and assigned the logical block addresses; and (B) information specifying to which page the designated storage area corresponds, among the pages contained in a block specified by information (A). It should be noted that the number of blocks specified by information (A), as well as the number of pages specified by information (B), is not limited to one.

Next the CPU 121 retrieves, from the BPT, the physical block address associated with any logical block address specified by information (A). Then, based on the retrieved physical block address and information (B), the CPU 121 specifies the page from which data is to be read, and reads out data therefrom.

By the process described above, data is read out from the storage medium 3.

(Data Writing Process)

In the case of instructing the CPU 121 to write data in the storage medium 3, the computer 2 supplies, to the CPU 121, a command to write data in the storage medium 3 and information designating a storage area into which data is to be written.

Having supplied with the data write command and the information designating the storage area into which data is to be written, the CPU 121 converts the above information thereby to create information (A) and (B) described previously.

Then the CPU 121 retrieves, from the BSI, the physical block address of any empty block of the same number as the number of blocks specified by information (A).

Next the CPU 121 retrieves, from the BPT, the physical block address associated with any logical block address specified by information (A). Then the CPU 121 distinguishes the page (writing target page) specified by information (B) from other pages (non-writing target pages), among the pages belonging to the block assigned the physical block address retrieved from the BPT.

In the case where there is no physical block address associated with the logical block address specified by information (A), the CPU 121 writes data supplied from the computer 2 into the block specified by the physical block address retrieved from the BSI.

Thereafter the CPU 121 alters the contents of the BSI so that the contents after altered will not indicate, as an empty block, the block into which data has been written. Furthermore, the CPU 121 writes, into a storage area containing information written therein which represents the absence of any associated physical block address, the physical block address of the block into which data has been newly written. Having thus altered the contents of the BSI and BPT, the CPU 121 terminates the process.

On the other hand, in the case where there is the physical block address associated with the logical block address specified by information (A), the CPU 121 associates the block specified by the retrieved physical block address and the block specified by information (A) in one-to-one correspondence with each other. Thereafter the CPU 121 transfers the contents stored in the pages contained in the block specified by information (A) to the pages contained in the associated block and corresponding to the aforementioned pages in ordinal position relative to the top page.

Nevertheless, the contents of the page distinguished as the writing target page are not transferred. In place of the contents of the page, data to be written into the page, among data supplied from the computer 2, is written into the page.

Each time the writing of data into the empty block retrieved from the BSI is finished, the CPU 121 resets the block associated with the empty block. Then the CPU 121 writes an empty block code in the redundant portion of one of the pages belonging to the reset block.

Thereafter the CPU 121 accesses the BPT and overwrites, in that part of the BPT which stores the physical block address of the reset block, the physical block address of the block where writing has been finished. Thus, a logical block address which had an association with a block until the block was reset, is newly associated with another block where writing has been finished.

The CPU 121 also accesses the BSI and alters the BSI so that its contents after altered will indicate that the block where writing has been finished is not an empty block, but will indicate that the reset block is an empty block.

Having finished the writing of data into all empty blocks retrieved from the BSI and the alteration of the BSI and BPT, the CPU 121 terminates the writing process.

By the above-described process, data supplied from the computer 2 is stored in the storage medium 3. Furthermore, the contents of the BSI are altered so as to specify any empty block which has newly appeared and any empty block which has disappeared as a result of the data writing. The contents of the BPT are also altered so that a logical block address which was the address for a block until the block became empty, is newly associated with another block to which stored data has been transferred from the above block.

(Data Erasing Process)

In the case of erasing data from the storage medium 3 in units of blocks, the computer 2 supplies, to the CPU 121, a data erase command and the logical block address specifying a block in which data to be erased is present.

Having supplied with the data erase command and the logical block address specifying the block in which data to be erased is present, the CPU 121 retrieves the physical block address associated with the logical block address from the BPT. Thereafter the CPU 121 resets the block specified by the retrieved physical block address. Then the CPU 121 writes an empty block code in the redundant portion of one of the pages belonging to the reset block.

Next the CPU 121 alters the contents of the BSI stored in the SRAM 123 so that its contents after altered will specify the reset block as being an empty block. Then the CPU 121 terminates the process.

By the above-described process, data is erased block by block from the storage medium 3, and information specifying an empty block which has newly appeared as a result of the erasure is added to the BSI.

In the case of erasing data from storage areas whose sizes are arbitrary and are not necessarily expressed in blocks, the above-described data writing process needs only be performed so that no data is written into a location where data supplied from the computer 2 is to be written.

The structure of the access apparatus is not limited to that described above.

For example, not only the replacement Identify-Drive data, but also the CIS data and the device ID data can be updated by the controller 12 in accordance with a command supplied from the computer 2 to the controller 12.

Moreover, the CPU 121 need not wait until a command to update the contents of the Identify-Drive data is supplied from the computer 2. The CPU 121 can read out the replacement Identify-Drive data from the replacement Identify-Drive data area of the storage section at an arbitrary time which is, for example, a point in time immediately after the completion of the above-described initial process. Then, among the Identify-Drive data stored in the SRAM 123, the CPU 121 can replace the portions specified by data (1) and (2) contained in the read-out replacement Identify-Drive data, with data (3) contained in the replacement Identify-Drive data.

Figure 8:
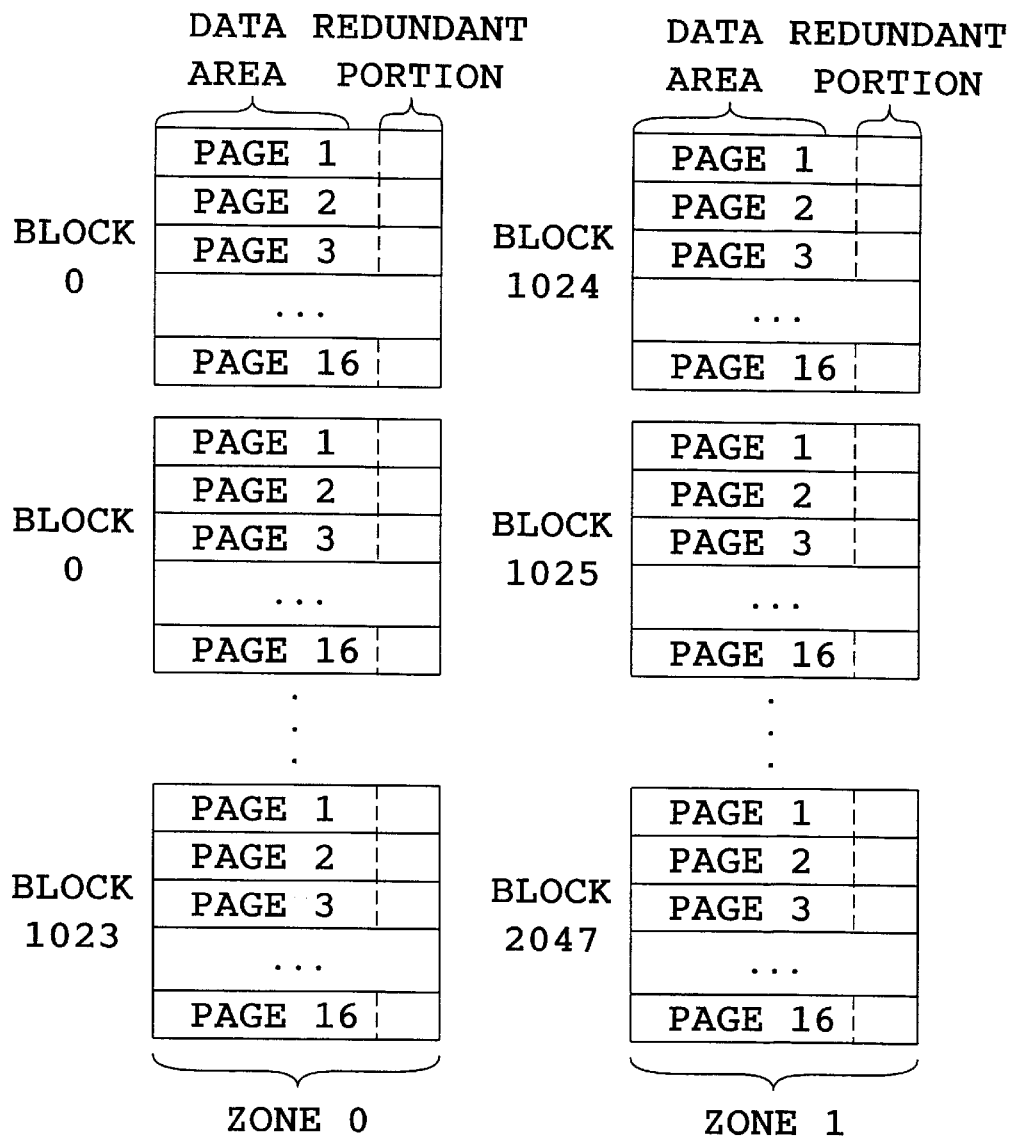
FIG. 8 is a diagram which schematically illustrates the logical structure of a modification of the storage area depicted in FIG. 4.

Moreover, the entire storage area of the recording medium 3 may be divided into a plurality of zones. For example, let it be assumed that the entire storage area of the storage medium 3 is made up of 32768 pages, every sixteen pages from top form one block, the total number of blocks is 2048, and serial physical block addresses 0 to 2047 are assigned to the blocks sequentially from the top block, as illustrated in FIG. 8, for example.

Let it be further assumed that blocks 0 to 1023 form a zone having zone address 0, while the remaining blocks 1024 to 2047 form a zone having zone address 1.

Let it be further assumed that the range of values that the logical block addresses assigned to the blocks belonging to each zone can take, is predetermined by a program which is executed by the CPU 121.

More specifically, suppose that the logical block addresses assigned to the blocks belonging to zone 0 take values ranging from 0000h to 03E7h, while the logical block addresses assigned to the blocks belonging to zone 1 take values ranging from 03E8h to 07CFh, for example.

In the case where the entire storage area of the storage medium 3 has the logical structure shown in FIG. 8, the BPT may store information representing the correspondence between the logical and physical block addresses assigned to the individual blocks belonging to any zone.

In this case, the CPU 121 stores, in itself, information indicating to which zone the blocks, having the logical and physical block addresses whose correspondence is shown in the BPT, belong. Alternatively, the CPU 121 causes the SRAM 123 to store the aforementioned information.

When reading out data from the storage medium 3 in accordance with an instruction from the computer 2, the CPU 121 specifies the zone containing a block having a logical block address supplied from the computer 2. Moreover, based on the information stored in either the CPU 121 itself or the SRAM 123, the CPU 121 specifies the target zone to which the blocks, having the logical and physical block addresses whose correspondence is currently shown in the BPT, belong. Then, the CPU 121 determines whether the specified two zones are substantially identical with each other.

When the CPU 121 determines that both zones are substantially identical with each other, then the CPU 121 retrieves from the BPT the physical block address associated with the logical block address supplied from the computer 2, and uses the retrieved physical block address as information (A) described previously.

On the other hand, when the CPU 121 determines that both zones are not substantially identical with each other, then the CPU 121 carries out the aforementioned steps S15 to S20 with respect to that one of the specified two zones which does not contain the blocks represented by the physical block addresses shown in the BPT currently stored in the storage medium 3, in order to create a new BPT. Thereafter, using the logical block address as a key, the CPU 121 again searches the BPT, retrieves therefrom the physical block address associated with the logical block address, and uses the retrieved physical block address as information (A) mentioned previously.

Figure 9:
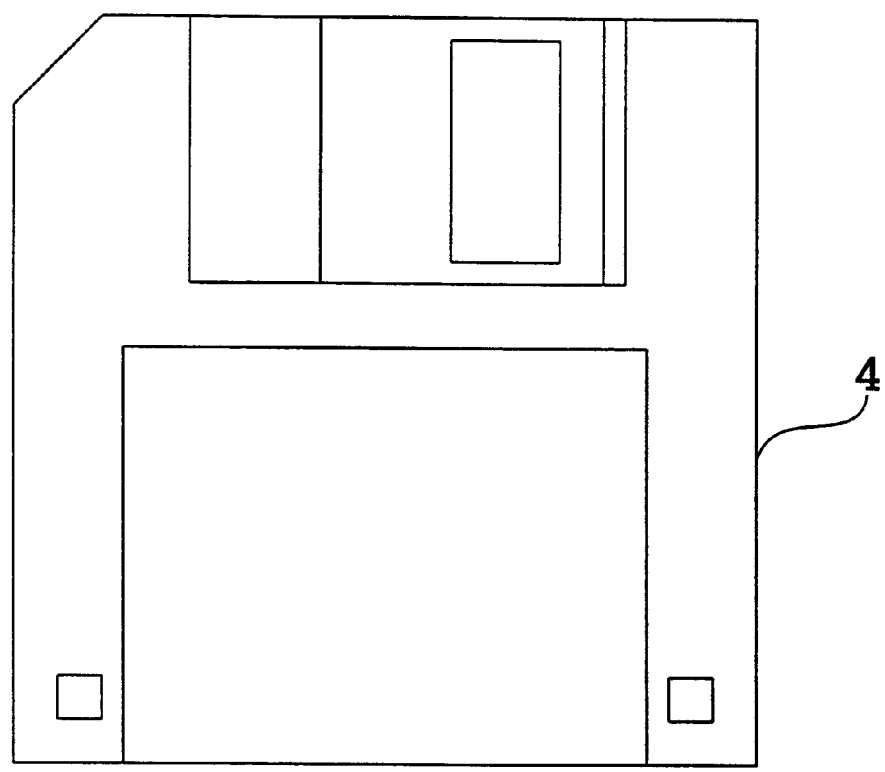
FIG. 9 is a diagram illustrating a floppy disk which contains a program recorded thereon for causing a computer to realize the aforementioned embodiment of the present invention.
Figure 10:
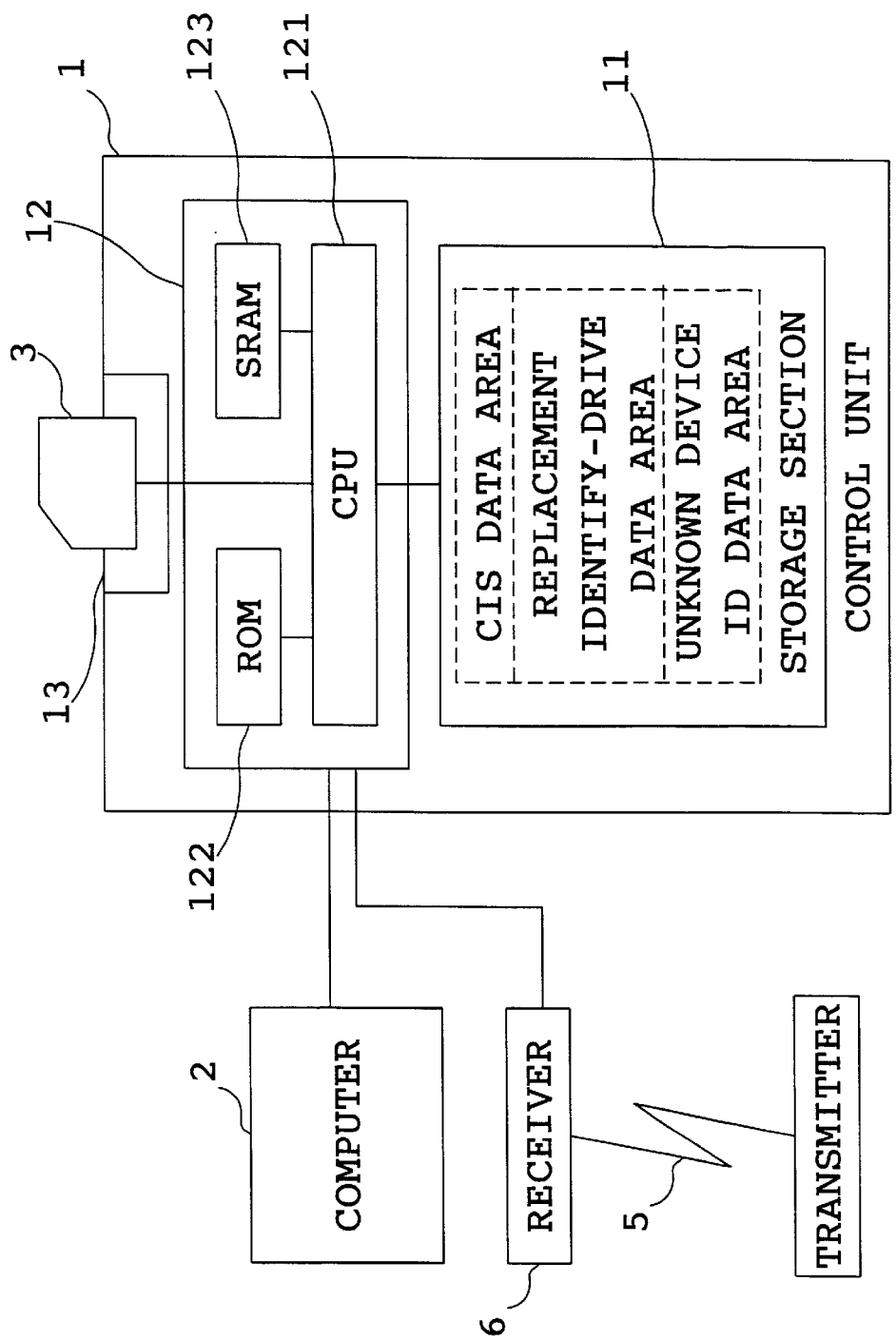
FIG. 10 is a diagram depicting a structure for distributing, through utilization of a carrier wave, the program for causing a computer to realize the aforementioned embodiment of the present invention.

An embodiment of the present invention has been described above. However, the access apparatus of the present invention is not limited to a system dedicated for gaining access, and can be realized utilizing an ordinary computer system. For example, the access apparatus which carries out the above-described processes can be attained by installing a program for causing a personal computer with a slot for the insertion of the storage medium 3 to execute the above-described operations, from a medium (such as a floppy disk 4 illustrated in FIG. 9 or a CD-ROM) containing the program stored therein.

Further, the medium from which the program is supplied to the computer may be a communication medium (which temporarily stores the program as in the case of a communication line, a communication network and a communication system). For example, the program may be posted on a bulletin board (BBS) for the communication network, and may be distributed through the network. Alternatively, the program may be supplied in the manner of being distributed to the controller 12 through a receiver 6 as a modulated wave 5 attained by modulating a carrier wave in accordance with the program.

The distributed program is run and executed under the control of an OS, in the same manner as other application programs, in order to carry out the above-described processes.

In the case where the OS undertakes the execution of some of the steps involved in the above-described processes or forms a part of one structural element of the present invention, the steps to be executed by the OS may be excluded from the program, and the program from which the steps have been thus excluded may be stored in a storage medium. In this case also, the program stored in the storage medium is one for causing a computer to carry out the individual functions or steps.

According to the present invention, as explained above, an access apparatus, a data processing system and an access method, all for enabling access to a variety of storage mediums which differ in the conditions for access from each other, can be realized with a simple structure.

This application is based on Japanese Patent Application No. H10-195230 filed Jul. 10, 1998, including specification, claims, drawings and summary. The disclosure of the above Japanese Patent Application is incorporated herein by reference in its entirety.

What is claimed is:

1. An access apparatus comprising:
 a controller which acquires condition-defined data from an external storage medium that stores data containing the condition-defined data specifying conditions for access to the external storage medium and which performs an acquisition of data from the external storage medium and an erasure and storage of data other than the condition-defined data from and into the external storage medium in accordance with the conditions specified by the condition-defined data as acquired; and
 internal storage which stores replacement data representing contents of a replacement for a to-be-replaced portion of the condition-defined data;
 wherein:
  said controller accesses the external storage medium in accordance with the conditions specified by the condition-defined data, acquired from the external storage medium and whose to-be-replaced portion has been replaced with the replacement data;
  the external storage medium has a plurality of storage areas assigned physical addresses and including storage areas which store data to be acquired and storage areas which store data to be erased, and the external storage medium stores an address translation table which shows the physical addresses and logical addresses associated therewith;
  said controller performs
   designating logical addresses specifying the storage areas which store the data to be acquired and the storage areas which store the data to be erased, and
   specifying the physical addresses associated with the designated logical addresses, based on the address translation table and the designated logical addresses, and accessing the storage areas assigned the specified physical addresses;
  said plurality of storage areas have been divided into groups;
  the address translation table shows the physical addresses assigned to the storage areas belonging to one of said groups and the logical addresses associated with said physical addresses; and
  said controller performs
   determining whether it is possible to specify, based on the address translation table, the physical addresses associated with the logical addresses designated by said controller, and specifying among said groups a group of storage areas assigned the physical addresses associated with the designated logical addresses, when said controller determines that it is impossible to specify said physical address,
   updating the address translation table so as to show the physical addresses assigned to the specified group of storage areas and the logical addresses associated with said physical addresses, and
   specifying the physical addresses associated with the logical addresses designated by said controller, based on the updated address translation table and the designated logical addresses, and accessing the storage areas assigned the specified physical addresses.

2. An access method for acquiring condition-defined data from an external storage medium that stores data containing the condition-defined data specifying conditions for access to the external storage medium, and for accessing the external storage medium in accordance with the conditions specified by the condition-defined data as acquired, said access method comprising the steps of:
 storing replacement data which represents contents of a replacement for a to-be-replaced portion of the condition-defined data;

performing an acquisition of data from the external storage medium and an erasure and storage of data other than the condition-defined data from and into the external storage medium in accordance with the conditions specified by the condition-defined data, acquired from the external storage medium and whose to-be-replaced portion has been replaced with the replacement data;

wherein the external storage medium has a plurality of storage areas assigned physical addresses and including storage areas which store data to be acquired and storage areas which store data to be erased, and the external storage medium stores an address translation table which shows the physical addresses and local addresses associated therewith;

designating logical addresses specifying the storage areas which store the data to be acquired and the storage areas which store the data to be erased;

specifying the physical addresses associated with the designated logical addresses, based on the address translation table and the designated logical addresses, and accessing the storage areas assigned the specified physical addresses;

wherein said plurality of storage areas have been divided into groups; and wherein the address translation table shows the physical addresses assigned to the storage areas belonging to one of said groups and the logical addresses associated with said physical addresses;

determining whether it is possible to specify, based on the address translation table, the physical addresses associated with the designated logical addresses, and specifying among said groups a group of storage areas assigned the physical addresses associated with the designated logical addresses, when it is determined that it is impossible to specify said physical address;

updating the address translation table so as to show the physical addresses assigned to the specified group of storage areas and the logical addresses associated with said physical addresses; and specifying the physical addresses associated with the designated logical addresses, based on the updated address translation table and the designated logical addresses, and accessing the storage areas assigned the specified physical addresses.

3. A computer program product, including a computer usable medium having a computer readable program embodied therein for causing a computer, which performs an acquisition of data from an external storage medium and an erasure and storage of data from and into the external storage medium, to serve as:

internal storage which stores replacement data representing contents of a replacement for a to-be-replaced portion of condition-defined data specifying conditions for access to the external storage medium; and a controller which acquires the condition-defined data from the external storage medium that stores data containing the condition-defined data, and which performs an acquisition of data from the external storage medium and an erasure and storage of data other than the condition-defined data from and into the external storage medium in accordance with conditions specified by the condition-defined data, acquired from the external storage medium and whose to-be-replaced portion has been replaced with the replacement data;

wherein:

the external storage medium has a plurality of storage areas assigned physical addresses and including storage areas which store data to be acquired and storage areas which store data to be erased, and the external storage medium stores an address translation table which shows the physical addresses and logical addresses associated therewith;

said controller performs designating logical addresses specifying the storage areas which store the data to be acquired and the storage areas which store the data to be erased, and specifying the physical addresses associated with the designated logical addresses, based on the address translation table and the designated logical addresses, and accessing the storage areas assigned the specified physical addresses;

said plurality of storage areas have been divided into groups;

the address translation table shows the physical addresses assigned to the storage areas belonging to one of said groups and the logical addresses associated with said physical addresses; and said controller performs determining whether it is possible to specify, based on the address translation table, the physical addresses associated with the logical addresses designated by said controller, and specifying among said groups a group of storage areas assigned the physical addresses associated with the designated logical addresses, when said controller determines that it is impossible to specify said physical address, updating the address translation table so as to show the physical addresses assigned to the specified group of storage areas and the logical addresses associated with said physical addresses, and specifying the physical addresses associated with the logical addresses designated by said controller, based on the updated address translation table and the designated logical addresses, and accessing the storage areas assigned the specified physical addresses.

4. A computer data signal embedded in a carrier wave and representing a program for causing a computer, which performs an acquisition of data from an external storage medium and an erasure and storage of data from and into the external storage medium, to serve as:

internal storage which stores replacement data representing contents of a replacement for a to-be-replaced portion of condition-defined data specifying conditions for access to the external storage medium; and a controller which acquires the condition-defined data from the external storage medium that stores data containing the condition-defined data, and which performs an acquisition of data from the external storage medium and an erasure and storage of data other than the condition-defined data from and into the external storage medium in accordance with conditions specified by the condition-defined data, acquired from the external storage medium and whose to-be-replaced portion has been replaced with the replacement data;

wherein:

the external storage medium has a plurality of storage areas assigned physical addresses and including storage areas which store data to be acquired and storage areas which store data to be erased, and the external storage medium stores an address translation table which shows the physical addresses and logical addresses associated therewith;

said controller performs designating logical addresses specifying the storage areas which store the data to be acquired and the storage areas which store the data to be erased, and specifying the physical addresses associated with the designated logical addresses, based on the address translation table and the designated logical addresses, and accessing the storage areas assigned the specified physical addresses;

said plurality of storage areas have been divided into groups;

the address translation table shows the physical addresses assigned to the storage areas belonging to one of said groups and the logical addresses associated with said physical addresses; and said controller performs determining whether it is possible to specify, based on the address translation table, the physical addresses associated with the logical addresses designated by said controller, and specifying among said groups a group of storage areas assigned the physical addresses associated with the designated logical addresses, when said controller determines that it is impossible to specify said physical address, updating the address translation table so as to show the physical addresses assigned to the specified group of storage areas and the logical addresses associated with said physical addresses, and specifying the physical addresses associated with the logical addresses designated by said controller, based on the updated address translation table and the designated logical addresses, and accessing the storage areas assigned the specified physical addresses.

* * * * *